Aug. 11, 1942.    C. W. MOTT    2,292,962
TRACTOR IMPLEMENT
Filed Nov. 29, 1940    3 Sheets-Sheet 1

Inventor
Carl W. Mott
By Paul Pippel Atty.

Aug. 11, 1942.    C. W. MOTT    2,292,962
TRACTOR IMPLEMENT
Filed Nov. 29, 1940    3 Sheets-Sheet 3
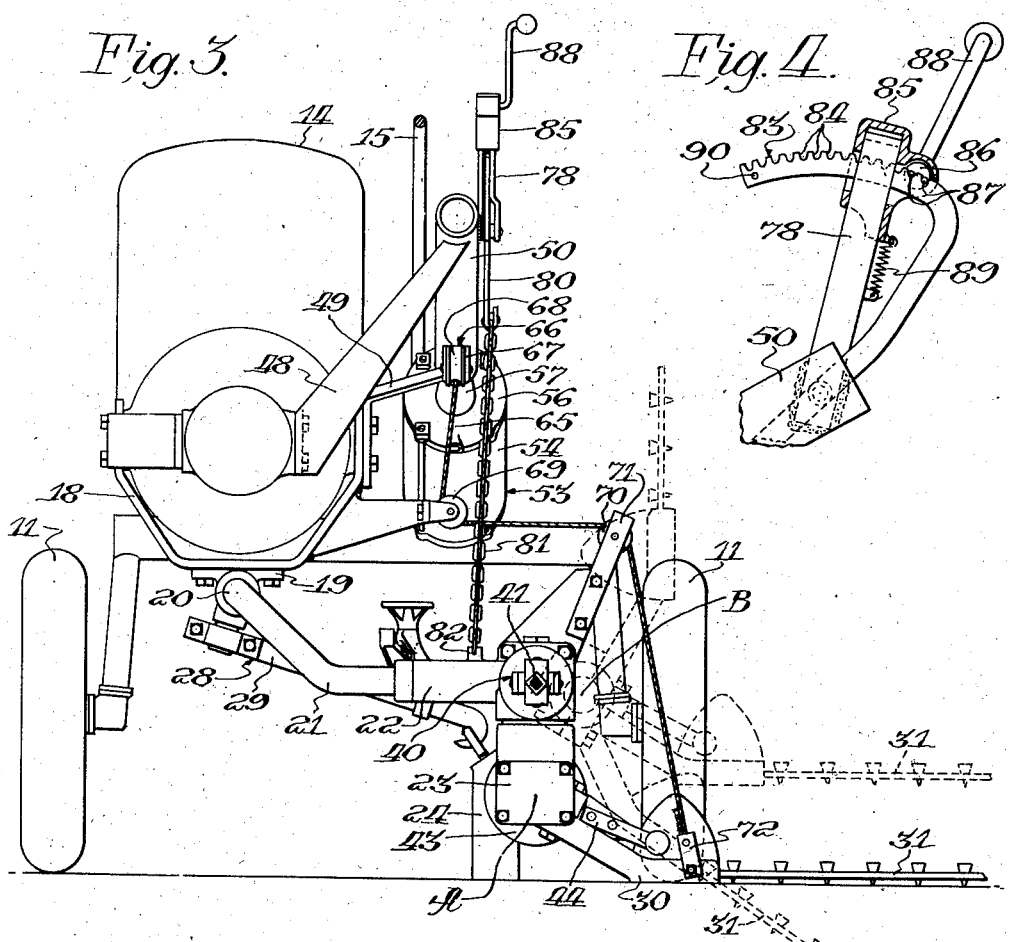
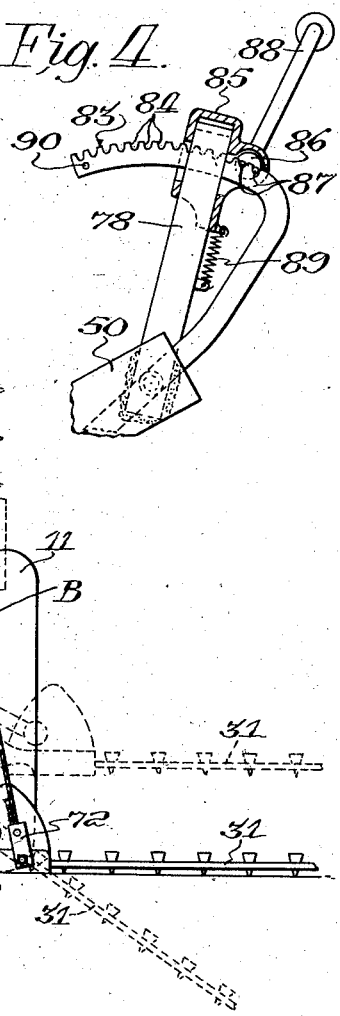
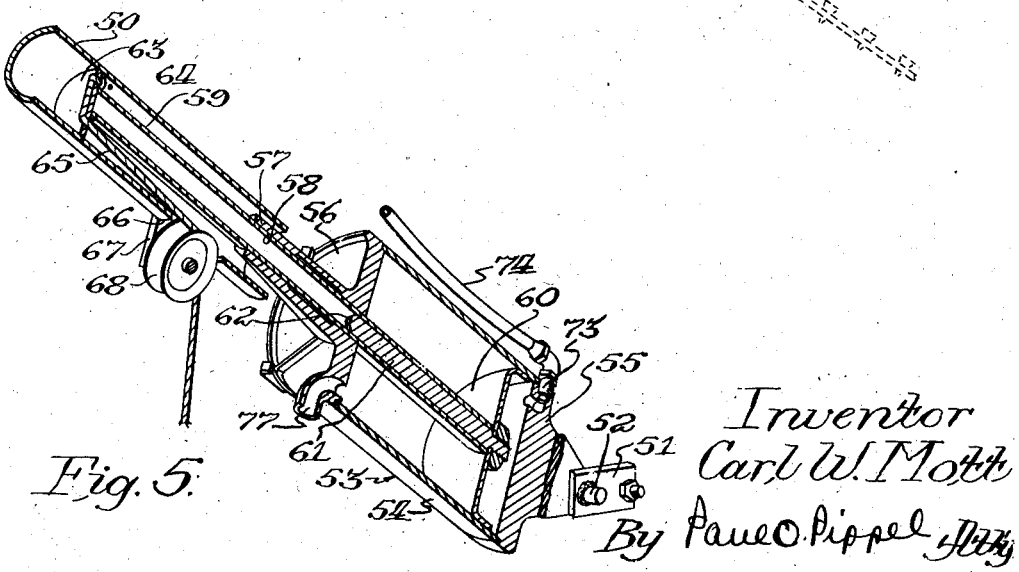
Inventor
Carl W. Mott
By Paul O. Pippel Atty Patented Aug. 11, 1942

2,292,962

UNITED STATES PATENT OFFICE 2,292,962

TRACTOR IMPLEMENT

Carl W. Mott, La Grange, Ill., assignor to International Harvester Company, a corporation of New Jersey Application November 29, 1940, Serial No. 367,755

16 Claims. (Cl. 56—25)

This invention relates to a frame-carried implement, and more particularly to an improved operating means for adjusting an implement part with respect to the frame. The invention contemplates as its principal object the provision of improved lifting means for a tractor-mounted or tractor-connected implement, which means provides a simplified mechanism for raising and lowering an implement part from ground to transport position or for otherwise moving or adjusting an implement part.

An important object is the provision of means for mounting the lifting means on a tractor or any other wheeled frame on which the implement is carried.

Another object is the adaptation of the lifting means especially for use in connection with a tractor mounted mower having cutting mechanism adapted to operate at various cutting heights.

Another object is to provide means for raising and lowering the cutting mechanism and additional means for adjusting the cutting mechanism with respect to its operation in different cutting positions.

Another object is the provision of lifting means in the form of a cylinder and piston comprising parts readily mounted in or demountable from position on the tractor or other frame on which it is carried.

And, another object is the provision of a pulley and cable arrangement for adjusting the implement part.

And still another object is the provision and mounting of an implement frame structure and lifting means therefor in a desirable and convenient position at one side of a tractor having a longitudinal body offset laterally from the longitudinal center line of the tractor.

Briefly and specifically, these and other desirable objects are achieved in one particular embodiment of the invention in the provision of a lifting means for a tractor-mounted mower. In general, the structure in which the lift is mounted comprises a tractor of the offset type having a longitudinal body offset laterally with respect to the longitudinal center line of the tractor, said tractor having mounted thereon a transversely extending cutter-bar adapted to be raised and lowered. The lifting means comprises a cylinder disposed longitudinally of the tractor and having a piston connected to a member slidable longitudinally of the tractor, which member is connected through a cable and a plurality of pulleys to the cutter-bar. The lifting means and supporting structure for the cutter-bar are disposed at that side of the tractor having the greatest space between the body side and the front and rear wheels at that side.

A more complete understanding of the objects of the invention may be had from the following detailed description taken in conjunction with the accompanying sheets of drawings, in which:

Figure 3 is a transverse sectional view taken substantially along the line 3—3 of Figure 2, showing in broken lines different positions of the cutting means;

Figure 4 is an enlarged view, partly in section, of the adjusting means for the mower coupling bar; and, Figure 5 is a perspective view, in section, showing the lifting cylinder and its component parts.

Figure 1:
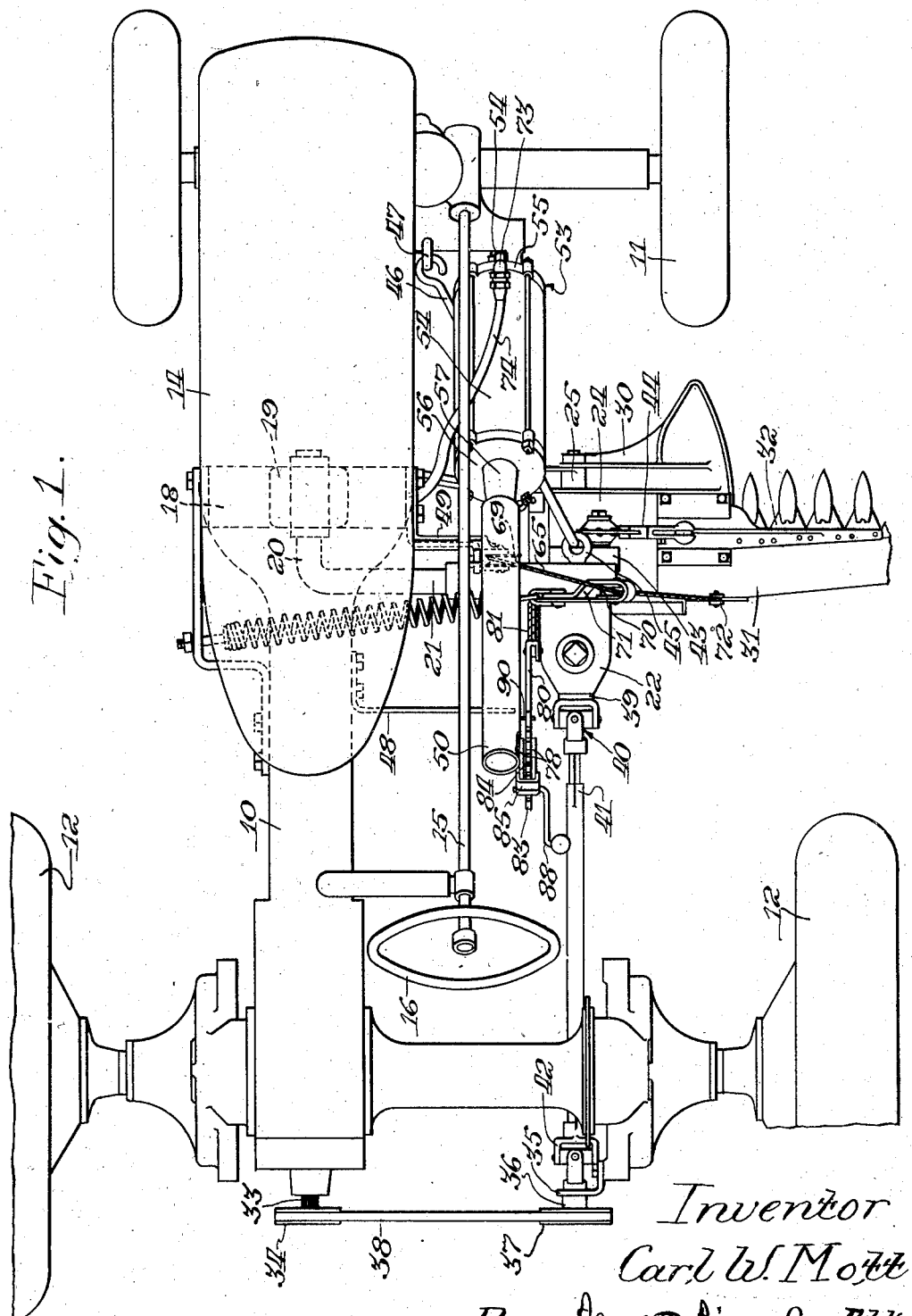
Figure 1 is a plan view of a tractor-mounted mower incorporating the improved lifting means.
Figure 2:
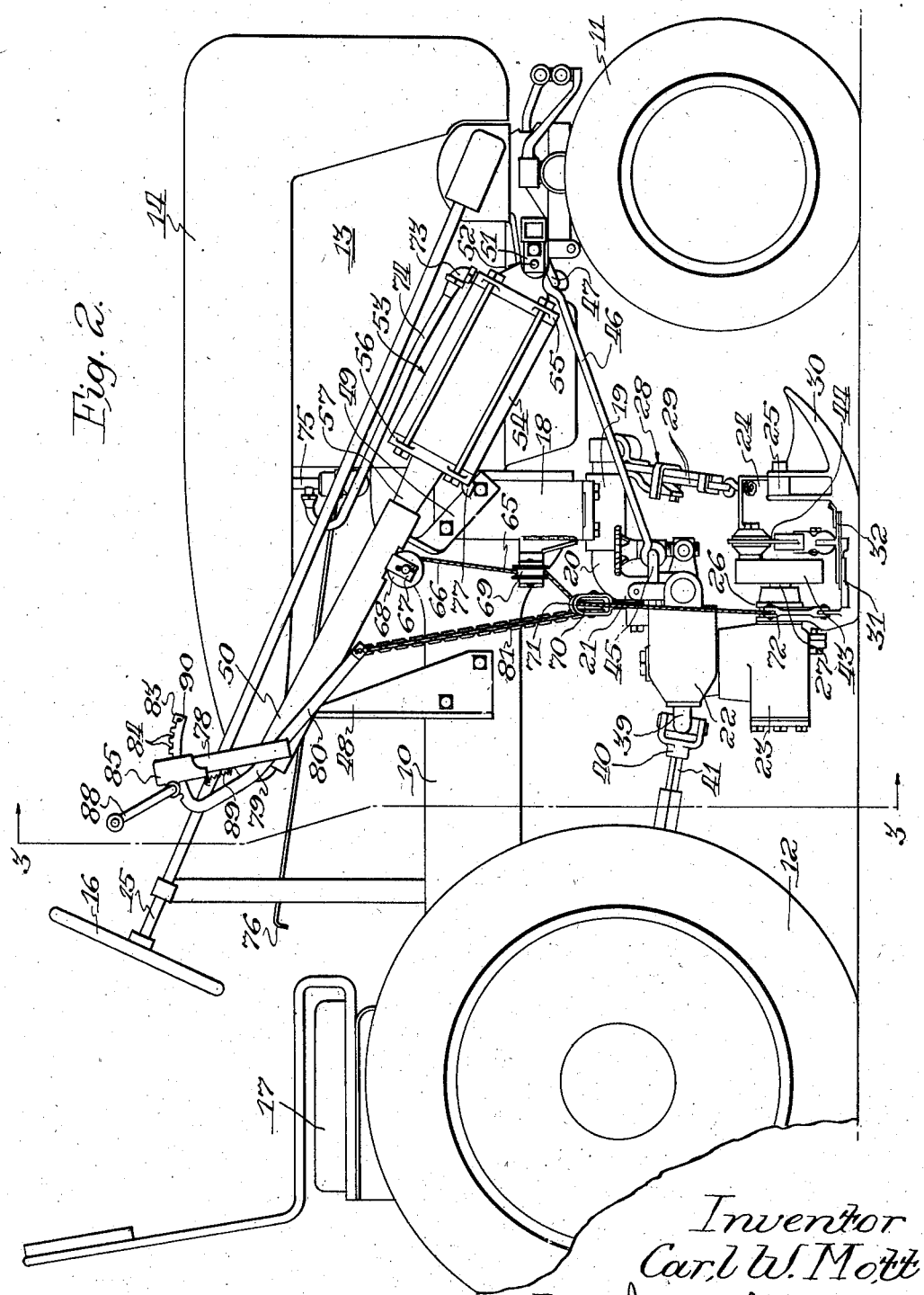
Figure 2 is a side elevational view of the same.

The particular embodiment of the invention chosen for the purposes of illustration is that of a tractor-mounted mower. As shown in Figures 1 and 2, the tractor comprises a longitudinal main frame or body 10 carried at its forward end on a pair of laterally spaced front wheels 11 and at its rear end on a pair of drive wheels 12. The forward position of the body 10 includes the usual engine, generally indicated at 13, and a radiator grille and hood structure 14. The front wheels are steered through the medium of a steering rod 15 and a steering wheel 16. An operator's station 17 is provided at the rear of the tractor. It will be seen that the body 10 is laterally offset with respect to the longitudinal center line that passes through the front and rear axles. The seat 17 is disposed to the right of this line, thereby affording the operator unobstructed vision forwardly of the seat. A tractor of this type is disclosed in detail in the United States patent to Johnston et al., 2,221,546. It will be understood, however, that the invention in other aspects includes the use of any other vehicle for the mounting or connecting of an implement or that any separate frame may be provided for the implement.

The particular implement chosen for purposes of disclosure is a mower and particularly a mower of the so-called "highway" type. The implement includes a frame assembly or supporting structure at one side of the body, particularly at the right side of the body where the greatest space is provided between the body side and the front and rear wheels at that side. An intermediate portion of the tractor body 10 carries a U-shaped frame 18. This frame is provided at its lowermost portion with a bearing 19 providing an axis generally paralleling the longitudinal axis of the tractor. This bearing carries the forwardly bent end 20 of a transverse coupling bar or swingable support 21, the bar being thus mounted for vertical movement about the axis of the bearing. The outer or grassward end of the coupling bar carries thereon an upper casting 22 which has pivoted thereto on a vertical axis a second or lower casting 23. This second casting includes a forwardly extending portion 24 provided with a bearing 25. This bearing 25 is in longitudinal alinement with and longitudinally spaced from a second bearing 26. The common axis of the two bearings is also coincidental with the rotating axis of a longitudinal shaft 27 journaled in the lower casting 23. This structure is similar to that disclosed in assignee's copending application, Serial Number 335,436, filed May 16, 1940. The forwardly extending portion 20 of the coupling bar 21 includes an extension ahead of the bearing 19, which extension provides a connection for a releasable means 28. This means serves normally to retain the cutter-bar in operating position and comprises a pair of releasable bars 29, one of which is connected to the portion 24 of the casting 23 and the other of which is connected to the aforesaid portion 20 of the coupling bar 21. The bars are releasable when the cutter-bar strikes an obstruction, all as will hereinafter appear. This releasable means may assume any conventional form and forms no part of the present invention except insofar as it is part of the mower structure herein illustrated.

The bearings 25 and 26 on the casting 23 serve to mount a mower shoe 30. The mounting of the shoe on the bearings is such that the shoe has pivotal movement vertically about the longitudinal axis provided by the bearings. The shoe comprises part of a cutting mechanism including a cutter-bar 31, carrying a reciprocating knife 32. The cutting mechanism may likewise be of any suitable form.

A power take-off shaft 33 extends longitudinally at the rear of the tractor body and carries a pulley 34. A portion of the tractor body 10, at a point laterally spaced from the shaft 33, carries a bearing 35 journaling a stub shaft 36 which carries a pulley 37. A drive belt 38 connects the pulleys 34 and 37. The casting 22 has journaled therein a rearwardly extending stub shaft 39 connected by a universal joint 40 to a rearwardly extending shaft 41, the shaft 41 being connected at its other end to the stub shaft 36 by a second universal joint 42. The shaft 41 is preferably composed of two parts telescopically arranged to compensate for the vertical movement of the cutting mechanism. It will be understood, of course, that any suitable drive mechanism may be provided. The castings 22 and 23 form housings containing drive gearing, not shown, from which the shaft 27 is driven by the shaft 41. A typical drive gearing arrangement is shown in assignee's application referred to above. The shaft 27 carries an eccentric 43 connected by a pitman 44 to the reciprocating knife 32. This structure is generally conventional. The casting 22 includes at its forward portion an eye 45 which is connected to a rod 46 which is in turn connected to a forward portion of the tractor as at 47. This rod increases the stability of the mower structure and yet permits vertical movement of the coupling bar and cutting mechanism with respect to the tractor.

From the foregoing description it will be seen that the coupling bar is vertically movable with respect to the tractor about the longitudinal axis in the bearing 19. Further, the cutter-bar 31 has vertical movement with respect to the coupling bar about the longitudinal axis through the bearings 25 and 26. Accordingly, the cutting mechanism is free to follow varying ground contours and is further adapted to be adjusted to any position for cutting at any height or angle. In order that the cutter-bar may be so positioned at the will of the operator, the improved lifting means comprising an important feature of the present invention is provided. This lifting means will be described with reference to the particular mower structure illustrated, but it will be understood that the same means may be utilized in conjunction with other types of implement arrangements.

An intermediate portion of the tractor body 10 carries at one side thereof a laterally and upwardly extending bracket 48. A second bracket 49 is carried by the frame part 18 and at a point forwardly of the bracket 48. The upper ends of the brackets rigidly carry a generally longitudinally extending, rearwardly inclined tubular support 50. The forward portion of the tractor body is provided with a bracket 51 which is provided with a transverse connecting pin 52. As best shown in Figure 5, the pin 52 is preferably welded to a portion of the bracket 51. This pin carries one end of a cylinder 53, a cotter pin or other suitable locking member 54 being passed through the pin to retain the cylinder in place.

As best shown in Figure 5, the cylinder comprises a cylindrical casing 54 having opposite end portions 55 and 56. The portion 55 is the one connected to the mounting pin 52. The end portion 56 includes an integral, rearwardly extending sleeve portion 57, formed with a bore 58 which extends entirely through the end portion 56. The axis of the cylinder is coincident with the axis of the tube 50. A longitudinal member 59, preferably in the form of a tube, is slidably carried in the bore 58 of the sleeve portion 57. That portion of the member 59 within the cylinder 53 abuts the face of a piston 60 slidably carried in the cylinder. The piston includes a short piston rod 61 rigidly secured to the piston and extending within the member 59 to a point just within the end 56 of the cylinder. This end of the piston rod is preferably tapered as at 62, for purposes that will hereinafter appear.

The other end of the member 59, as is apparent from Figure 5, extends within the tubular support 50 and carries rigidly thereon a circular plate 63. This plate is formed with a pair of openings 64 for the purpose of mounting one end of a lifting cable 65. The wall of the tubular support 50 is cut out to provide an opening 66. A bracket or bearing 67 is rigidly secured to the member 50 outside this opening and serves to journal thereon a guide or pulley 68. The lifting cable 65 is passed through the two small openings 64 in the plate 63 and one end thereof is knotted or otherwise rigidly secured behind the plate 63. It will be understood that any suitable means of anchoring the cable to the plate 63 may be utilized. The cable then passes through the opening 66 in the member 50 and over the pulley 68. The frame part 18 which is journaled to the intermediate part of the tractor 10 carries rotatably thereon, on a longitudinal axis, a second pulley 69. A third pulley 70 is journaled on a longitudinal axis on a supporting bracket 71 rigidly carried by the upper casting 22 of the mower assembly. The cable 66 passes under the pulley 69 and over the pulley 70, the other end of the cable being rigidly secured as at 72 to a portion of the cutter-bar 31 laterally spaced to the grassward side of the longitudinal pivot axis provided by the bearings 25 and 26 between the shoe 30 and the coupling bar 21.

The particular type of lifting cylinder selected to illustrate the improved lifting means is of the exhaust type, being powered by the exhaust gases from the engine 13. The lifting cylinder in detail and the manner in which it is powered form no part of the present invention, it being understood that any form of lifting means may be suitably used in conjunction with the construction previously set forth. Accordingly, a general description of the operation of the cylinder lift will suffice for the present purpose, the detail construction being disclosed in assignee's copending application Serial No. 353,099, filed August 17, 1940. The end portion 55 of the cylinder is provided with an inlet 73 to which is connected an inlet conduit 74. This conduit is connected at its other end to a valve generally indicated at 75 which forms part of a connection with the exhaust manifold, not shown, of the tractor engine. This valve is controlled in any suitable manner from the operator's station, a control member 76 being generally indicated in the present disclosure. The other end 56 of the cylinder is provided with an outlet port 77 for the escape of exhaust gases after the piston has been reciprocated.

In addition to the lifting means for the cutting mechanism, there is provided also a lifting means for adjusting the coupling bar about its longitudinal pivot in the bearing 19 on the frame 18. As best shown in Figures 2 and 4, the tubular support 50 carries rigidly thereon an upstanding member 78. The support 50 further carries pivotally thereon a rockable arm 79. The member 79 includes a forwardly and downwardly extending portion 80 connected by a flexible means in the form of a chain 81 to an ear 82 on the casting 22. The upper portion of the arm 79 is in the form of a quadrant or rack 83, being formed with a plurality of notches 84. The upper portion of the member 78 carries slidably thereon a cap member 85 serving to journal a rotatable member 86 having a pair of transversely extending pins 87. The spacing of these pins is such that they occupy two of the notches 84 in the quadrant portion 83 of the arm 79. A crank 88 is provided for rotating the member 86. A tension spring 89 is connected between the cap member and a lower portion of the upstanding member 78 and serves to maintain engagement between the pins 87 and the notches 84. The forward portion of the quadrant portion 83 of the arm 79 is provided with a stop pin 90, which serves to prevent excessive relative movement between the member 78 and the quadrant portion 83. From the foregoing description it will be seen that rotation of the member 86 causes the pins 87 to move along the quadrant portion 83. Since the member 78 is rigid with respect to the member 50, the arm 79 will be rocked about its pivot on the member 50, thus raising and lowering the coupling bar about its longitudinal pivot axis in the bearing 19.

In the operation of the mower the cutter-bar in its normal position extends laterally outwardly from the tractor and is generally parallel to the ground. In this position the shoe 30 rides the ground and the coupling bar 21 extends generally horizontally and parallels the ground. The normal positions of the parts are shown in full lines in Figure 3. In this position of the mower, the longitudinal axis between the coupling bar 21 and the cutter-bar 31 is generally at the point designated by the letter A. Since the particular type of mower illustrated is of the highway type and is therefore adapted to cut under varying circumstances, it is desirable that a high-cutting position be available for the cutter-bar. When the cutter-bar is to be used in this position, the crank 88 is operated to raise the cutter-bar vertically about its pivot until the longitudinal axis between the coupling bar 31 and the cutter-bar 21 assumes an upper position, generally designated by the letter B. With the coupling bar in this position, the power lifting means is operated until the cutter-bar assumes a position extending laterally of the tractor and paralleling the ground, the cutter-bar being spaced above the ground to any desired height, as shown in broken, horizontal lines in Figure 3. It will be understood both the power means and the manual means may be used together to effect the proper adjustment of the cutter-bar at any desired height above the ground. The height of the longitudinal axis between the coupling bar 21 and the cutter-bar 31 determines to a large extent the height of the cutter-bar above the ground. Having once selected the position of this axis, the cutter-bar can be adjusted to any position extending laterally at the side of the tractor. Because of the location of the pulley 70 and the connection of the pulley 66 with the shoe 30, proper leverage is obtained for effecting relative movement between the cutter-bar 31 and the coupling bar 21, this movement taking place about the longitudinal axis previously referred to.

In order to raise the cutter-bar 31 to transport position, the power means is operated to pivot the cutter-bar about the longitudinal axis between the cutter-bar and the coupling bar. The cutter-bar will then assume a position extending vertically at one side of the tractor. This position is generally indicated in broken lines in Figure 3. The cutter-bar is then folded so that the lateral extent of the mower is confined within the width of the tractor.

In many instances it is necessary and desirable that the cutter-bar operate to cut on the side of a ditch or bank disposed at an angle to the plane over which the tractor operates. In short, the tractor may be operated on a level stretch while the cutter-bar is adapted to cut vegetation on an inclined surface. One such position of the cutter is shown in Figure 3, wherein broken lines represent the cutter-bar as disposed below the horizontal ground line. In this position of the cutter-bar the piston 60 is at the extreme end of its stroke so that the greatest length of the cable 66 is played out over the pulleys. This position of the cutter-bar may be obtained by an actuation of the valve 75, and the cutter-bar will assume the position by the force of gravity.

It is obvious, of course, that the cutter-bar may be adjusted to a position just the reverse of that just described; that is to say, a position in which the cutter-bar is angled upwardly with respect to the horizontal. To obtain such a position of the cutter-bar, it becomes necessary only to lower the coupling bar 21 so that the longitudinal axis between the cutter-bar and coupling bar assumes a position somewhat in the vicinity of that indicated at A. With the coupling bar in that position the power means is operated to pivot the cutter-bar with respect to the coupling bar. Any desired angle may be obtained by proper adjustment of the lifting means.

The cutter-bar may be moved to transport position, as previously described, by the single use of the power lifting means. This operation is facilitated by means of the mounting of the pulleys 69 and 70. When the piston 60 is moved rearwardly in the cylinder 53, the cable 66 is drawn into the tubular support 50. When the cutter-bar 31 is swung upwardly about its pivotal connection with the coupling bar, it reaches a predetermined maximum of movement with respect to the coupling bar and thereafter the coupling bar and the cutter-bar are moved vertically as a unit. In other adjustments of the mower structure the cutter-bar and the coupling bar 31 may be adjusted independently of each other.

An important feature of the invention is the provision of means whereby the cylinder 53 may be readily detached from the tractor and used elsewhere in connection with other implements. The mounting pin 52 on the bracket 51 at the front of the tractor has been previously described as permitting removal of the cylinder. Since the member 59 is slidably carried by the sleeve portion 57 of the end portion 56 of the cylinder, and since the piston rod 61 fits slidably in this member, it can be readily seen that, after detachment of the cylinder 52, the cylinder may be slipped downwardly and away from the support 50 and the member 59. Since the piston rod has a length extending just into the end portion 56 of the cylinder, there is no danger that the rod will fall within the cylinder. In other words, the end of the rod 61 is confined within the bore 58 in that end of the cylinder. Since this end of the rod is tapered as at 62, the cylinder may be readily replaced in position on the tractor, the tubular member 59 may be inserted in the bore 58, and readily passes over the tapered end of the piston rod.

From the foregoing description it will be seen that an improved lifting means has been provided for an implement of the type referred to. An important feature of the invention is the provision and mounting of the simplified power lifting means. Another feature of the invention is the provision of the manual adjustable means for moving a separate part of the implement. It will be understood, of course, that only a preferred embodiment of the invention has been illustrated and described and that numerous modifications and alterations may be made therein without departing from the spirit and scope of the invention as defined in the appended claims.

What is claimed is:

1. In a tractor mower, comprising a tractor having a longitudinal body and a power source, and a mower connected to the tractor and including a support mounted for vertical movement with respect to the tractor and cutting mechanism carried by the support for movement with respect to the support from lowered to raised position, the combination with the tractor of power-operated lift means for the cutting mechanism and lift means for the support, said first means comprising a bracket on the tractor, a member carried by said bracket for movement generally longitudinally of the tractor, expansible means carried by the tractor and connected to the aforesaid power source, said means including a cylinder and a piston movable therein and connected to the aforesaid member for moving the member longitudinally, a pulley carried by the tractor, a pulley carried by the support, a flexible connecting means engaging the cutting mechanism, passing around said pulleys and engaging the member, said lift means for the support including a lift member movably carried by the support independently of the first member, and means connecting said lift member and the support for moving the support vertically independently of the cutting mechanism.

2. In a tractor mower, comprising a tractor having a longitudinal body, and a mower connected to the tractor and including a support mounted for vertical movement with respect to the tractor and cutting mechanism carried by the support for movement with respect to the support from lowered to raised position, the combination with the tractor of lift means for the cutting mechanism, said means comprising a bracket on the tractor, a member carried by said bracket for movement longitudinally of the tractor, expansible means carried by the tractor and including a cylinder and a piston movable therein and connected to the aforesaid member for moving the member longitudinally, a guide carried by the tractor, a guide carried by the support, and a flexible connecting means engaging the cutting mechanism, passing over said guides and engaging the member for raising the cutting mechanism as the member is moved longitudinally.

3. A power lift assembly, comprising a cylinder having opposite ends, one end being formed with an opening, a piston movable in the cylinder and including a rod loosely entering said opening, and a tubular member passing through said opening and surrounding the rod.

4. In a tractor implement comprising a tractor including a longitudinal body and an implement connected to the tractor and having a movable part, the combination with the tractor of operating means for said part comprising a cylinder carried by the tractor and having a piston movable therein longitudinally of the tractor, a tubular member arranged generally longitudinally of and carried by the tractor, said member having an opening in the wall thereof, a guide carried by the member at its outside adjacent the opening, a rod slidable longitudinally in the tubular member, means for sliding said rod, and a flexible connecting means engaging said rod, passing through the opening in the tubular member and over the guide and engaging the implement part.

5. In a tractor implement comprising a tractor including a longitudinal body and an implement connected to the tractor and having a pair of movable parts, the combination with the tractor of operating means for said parts comprising a cylinder carried by the tractor and having a piston movable therein longitudinally of the tractor, a support on the tractor, a member carried by the support for movement longitudinally thereon and connected to the piston, a guide carried by the support, flexible means engaging the member, passing around the guide and engaging one of the aforesaid implement parts, a rockable member carried by the support, and means operatively connecting said member and the other implement part.

6. In a tractor implement comprising a tractor having a longitudinally body, and an implement having a frame and a part mounted for movement with respect to the frame, the combination with the tractor of operating means for said part comprising a bracket carried by the tractor adjacent the forward end and at one side of the tractor body, a second bracket carried at the same side of the body and spaced longitudinally rearwardly from the first bracket, a support carried by the second support and extending generally longitudinally toward the first bracket, a cylinder carried by the first bracket and having its axis generally alined longitudinally with the support, a piston in the cylinder, a member slidably carried at one end in the support for generally longitudinal movement with respect thereto and connected at its other end to the piston, and means connecting the member with the aforesaid implement part.

7. In a tractor implement comprising a tractor having a longitudinal body, and an implement having a frame and a part mounted for movement with respect to the frame, the combination with the tractor of operating means for said part comprising a bracket carried by the tractor adjacent its forward end and at one side of the tractor body, a second bracket carried at the same side of the body and spaced longitudinally rearwardly from the first bracket, a support carried by the second support and extending generally longitudinally toward the first bracket, a cylinder carried by the first bracket and having its axis generally alined longitudinally with the support, a piston in the cylinder, a member slidably carried at one end in the support for generally longitudinal movement with respect thereto and connected at its other end to the piston, a pulley carried by the support, a second pulley carried by the tractor, a third pulley carried by the implement frame, and a cable engaging the member, passing around the aforesaid pulleys and engaging the implement part for moving said part as the aforesaid member is moved.

8. In a tractor mower comprising a tractor having a longitudinal body and a mower connected to the tractor including a transverse coupling bar mounted for vertical movement and a transverse cutter-bar pivoted on the coupling bar on a longitudinal horizontal axis, the combination with the tractor of lifting means to pivot the cutter-bar about the aforesaid axis independently of the coupling bar, and second lifting means for moving the coupling bar vertically independently of the first lifting means, said second means including a support on the tractor, a lever pivoted on the support and provided with a rack portion, rotatable means carried by the support and engaging the rack portion of the lever to pivot the lever on the support, and means connecting the lever and the coupling bar.

9. In a tractor mower comprising a tractor having a longitudinal body and a mower connected to the tractor and including cutting mechanism mounted for vertical movement, the combination with the tractor of lifting means for moving the cutting mechanism vertically, said means including a support on the tractor, a lever pivoted on the support and provided with a rack portion, rotatable means carried by the support and engaging the rack portion of the lever to pivot the lever on the support, and means connecting the lever and the cutting mechanism.

10. In an implement comprising a frame and a part mounted for movement with respect to the frame, the combination with the frame of a tubular support carried by the frame and having an opening in the wall thereof, a member slidable in the support, means for actuating said member, a guide carried outside the support adjacent the opening therein, a cable engaged at one portion by the member within the support and passing through the opening and over the guide, and means engaging the cable with the aforesaid implement part.

11. In a tractor implement comprising a tractor including a longitudinal body and an implement connected to the tractor and having a movable part, the combination with the tractor of operating means for said part comprising a cylinder having its axis generally paralleling the tractor body, means removably connecting the cylinder to the tractor body, a piston operable in the cylinder, a support carried by the tractor longitudinally spaced from the cylinder, a generally longitudinally slidable member carried by the support, means removably connecting the member and the piston, and means connecting the member and the aforesaid implement part.

12. In a tractor implement comprising a tractor including a longitudinal body and an implement connected to the tractor and having a movable part, the combination with the tractor of operating means for said part comprising a tubular member carried by the tractor, said member having an opening in the wall thereof, a guide carried by the member at its outside adjacent the opening, a rod slidable in the tubular member, means for sliding said rod, and a flexible connecting means engaging said rod, passing through the opening in the tubular member and over the guide and engaging the implement part.

13. A tractor implement comprising a tractor having longitudinally spaced front and rear axle structures, each including a pair of transversely spaced wheels, said axle structures having a common longitudinal center line, a longitudinal body carried by said axle structure and offset laterally to one side of said center line, a power source on said body, an implement supporting frame connected to the body and disposed at the other side of said center line and between the front wheel and rear wheel at that side of the body, an implement frame part extending laterally from the supporting frame beyond the wheels at the aforesaid side of the body, means mounting said part on the frame for movement with respect to the frame, power actuating means for said part carried at said side of the tractor and connected to the aforesaid power source, and means connecting said actuating means to the laterally extending part of the implement frame.

14. A tractor implement comprising a tractor having longitudinally spaced front and rear axle structures, each including a pair of transversely spaced wheels, said axle structures having a common longitudinal center line, a longitudinal body carried by said axle structures and offset laterally to one side of said center line, a power source on said body, a mower frame connected to the body and disposed at the other side of said center line and between the front wheel and rear wheel at that side of the body, a cutter-bar extending laterally from the supporting frame beyond the wheels at the aforesaid side of the body, means mounting said cutter-bar on the frame for vertical movement with respect to the frame, power actuating means for said cutter-bar carried at said side of the tractor and connected to the aforesaid power source, and means connecting said actuating means to the cutter-bar for moving the cutter-bar vertically.

15. A tractor implement comprising a tractor having longitudinally spaced front and rear axle structures, each including a pair of transversely spaced wheels, said axle structures having a common longitudinal center line, a longitudinal body carried by said axle structures and offset laterally to one side of said center line, a power source on said body, an implement supporting frame connected to the body and disposed at the other side of said center line and between the front wheel and rear wheel at that side of the body, an implement frame part extending laterally from the aforesaid side of the body, means mounting said part on the frame for movement with respect to the frame for said part, said means comprising a cylinder disposed longitudinally at the aforesaid side of the body and between the front wheel and rear wheel at that side, a piston movably carried by the cylinder, means connecting the cylinder to the aforesaid power source, and means connecting the piston to the aforesaid implement frame part.

16. A tractor implement comprising a tractor having longitudinally spaced front and rear axle structures, each including a pair of transversely spaced wheels, said axle structures having a common longitudinal center line, a longitudinal body carried by said axle structures and offset laterally to one side of said center line, a power source on said body, an implement supporting frame disposed at the other side of said center line and between the front wheel and rear wheel at that side of the body, said frame including a part mounted for movement with respect to the tractor, and power actuating means for said part, said means comprising a cylinder disposed longitudinally at the aforesaid side of the body and between the front wheel and rear wheel at that side, a piston movably carried by the cylinder, means connecting the cylinder to the aforesaid power source, and means connecting the piston to the aforesaid implement frame part.

CARL W. MOTT.